US012692463B2

(12) United States Patent
Piorkowski

(10) Patent No.: US 12,692,463 B2
(45) Date of Patent: Jul. 28, 2026

(54) BLENDS OF ALCOHOL ETHOXYLATE AND METHYL ESTER SULFONATE IN UNIT DOSE PRODUCTS FOR IMPROVED MILDNESS

(71) Applicant: Henkel AG & Co. KGaA, Duesseldorf (DE)

(72) Inventor: Daniel Thomas Piorkowski, Fairfield, CT (US)

(73) Assignee: Henkel AG & Co. KGaA, Dusseldorf (DE)

( * ) Notice: Subject to any disclaimer, the term of this patent is extended or adjusted under 35 U.S.C. 154(b) by 363 days.

(21) Appl. No.: 18/498,199

(22) Filed: Oct. 31, 2023

(65) Prior Publication Data

US 2025/0136901 A1 May 1, 2025

(51) Int. Cl.

| | |
|---|---|
| ***C11D 3/00*** | (2006.01) |
| ***C11D 1/12*** | (2006.01) |
| ***C11D 3/34*** | (2006.01) |
| ***C11D 3/43*** | (2006.01) |
| ***C11D 17/00*** | (2006.01) |

(52) U.S. Cl.

CPC .......... *C11D 17/0039* (2013.01); *C11D 1/123* (2013.01); *C11D 3/3418* (2013.01); *C11D 3/43* (2013.01)

(58) Field of Classification Search

CPC ... C11D 17/0039; C11D 1/123; C11D 3/3418; C11D 3/43; C11D 1/28; C11D 1/831; C11D 3/2006; C11D 3/2041; C11D 1/72; C11D 17/043

USPC .................................................. 510/441, 442

See application file for complete search history.

(56) References Cited

U.S. PATENT DOCUMENTS

| | | | | |
|---|---|---|---|---|
| 6,551,982 | B1 | 4/2003 | Ricci et al. | |
| 8,551,929 | B2 * | 10/2013 | Graham ............... | C11D 17/042 510/439 |
| 10,774,294 | B2 | 9/2020 | Piorkowski | |
| 11,492,574 | B2 | 11/2022 | Sun et al. | |
| 2018/0016523 | A1 | 1/2018 | Coope Epstein et al. | |
| 2023/0257681 | A1 * | 8/2023 | Man ......................... | C11D 1/75 510/475 |
| 2023/0357682 | A1 * | 11/2023 | Yun ........................ | C12M 41/10 |

FOREIGN PATENT DOCUMENTS

WO WO 2015185689 A1 * 12/2015 ......... C11D 3/38636

OTHER PUBLICATIONS

Gotte, V.E., “Synthetische Tenside in Medizinisch-kosmetischen Badern,” Aesthetische Medizin 15:313-319, Berlin: Berliner Med. Verl. Anst., Germany (Oct. 1966).

* cited by examiner

*Primary Examiner* — Eisa B Elhilo

(74) *Attorney, Agent, or Firm* — Sterne, Kessler, Goldstein & Fox P.L.L.C.

(57) ABSTRACT

The present disclosure provides a unit dose product comprising a pouch formed from a water-soluble film material; and a detergent composition comprising about 5 to about 20 wt % water, about 35 to about 65 wt % of at least one surfactant, and a non-aqueous solvent, wherein the detergent composition is disposed within the pouch. The composition can further comprise additional components, such as a base, a performance polymer, an anti-redeposition agent, an enzyme, a bleaching agent, a bleach activator, a chelating agent, an optical brightener, a bitterant, a corrosion inhibitor, or a combination thereof. The detergent composition comprises surfactants with improved mildness and solvents with lower allergic components.

19 Claims, No Drawings

BLENDS OF ALCOHOL ETHOXYLATE AND METHYL ESTER SULFONATE IN UNIT DOSE PRODUCTS FOR IMPROVED MILDNESS

BACKGROUND

Laundry detergent compositions contain surfactants which impart good cleaning performance. However, many surfactant compositions can cause skin and eye irritation. Preferred surfactants for efficacy have included the anionic linear alkylbenzene sulfonates (LAS) that can be a harsh additive to detergent compositions, and replacements such as alcohol ethoxysulfonates can contain traces of regulated compounds. Further, solvents included in detergent compositions can be allergens. Propylene glycol was named the 2018 allergen of the year by the American Contact Dermatitis Society.

Packaging detergent compositions in unit dose products is a preferred consumer product for use in laundry applications. Such unit dose products have several advantages, including convenience of use and dispensing, lower cost per use, and minimized skin contact with potentially irritating cleaning compositions. However, formulating detergent compositions to be packaged in unit dose film pouches presents additional challenges.

There is a need for a unit dose product comprising a detergent composition that can effectively clean textiles while retaining mildness and limiting allergenic compounds.

BRIEF SUMMARY

The present disclosure relates to a unit dose product comprising:

- a pouch formed from a water-soluble film material;
- a detergent composition comprising about 5 to about 20 weight percent (wt %) water, about 20 to about 65 combined wt % of at least two surfactants comprising a methyl ester sulfonate (MES) and an alcohol ethoxylate (AE), and a non-aqueous solvent; and
- wherein the detergent composition is disposed within the pouch.

In some aspects, the MES comprises the formula $R^1CH(C(=O)OR^2)SO_3X$, wherein $R^1$ is a $C_8$-$C_{18}$ alkyl, $R^2$ is $CH_3$ or X, and X is a cation that balances the charge. In some aspects, the MES comprises at least one of sodium methyl 2-sulfolaurate and disodium 2-sulfolaurate. In some aspects, the MES comprises both sodium methyl 2-sulfolaurate and disodium 2-sulfolaurate.

In some aspects, an MES to AE weight ratio is at least 0.5:1. In some aspects, an MES to AE weight ratio is between 0.5:1 and 1:2.5.

In some aspects, the at least two surfactants further comprise an alkyl ether sulfate (AES).

In some aspects, the detergent composition comprises about 10 5 to about 20 wt % MES.

In some aspects, the detergent composition comprises about 15 to about 30 wt % AE.

In some aspects, the at least two surfactants further comprise a linear alkylbenzene sulfonate (LAS). In some aspects, a LAS to MES weight ratio is between about 1:0.5 to about 1:3.

In some aspects, the detergent composition does not comprise a linear alkylbenzene sulfonate.

In some aspects, the detergent composition comprises not more than 2 wt % monoethanolamine.

In some aspects, the detergent composition has a pH of about 6.5 to about 12. In some aspects, the detergent composition has a pH of about 7 to about 8.

In some aspects, the non-aqueous solvent is ethylene glycol, diethylene glycol, triethylene glycol, diethylene glycol monobutyl ether, propylene glycol, dipropylene glycol, tripropylene glycol, dipropylene glycol monobutyl ether, 1,3-butylene glycol, 1,4-butylene glycol, 1-(1-butoxy-2-propoxy)-2-propanol, 2-methyl-2,4-pentanediol, 1,5-pentanediol, 1,6-hexanediol, polyethylene glycol, glycerin, ethanol, or a combination thereof. In some aspects, the non-aqueous solvent comprises polyethylene glycol, propylene glycol, and glycerin in a weight ratio of about 3-5:1:1.

In some aspects, the detergent composition further comprises at least one additive selected from a base, an anti-redeposition agent, a performance polymer, a defoamer, an enzyme, a bleaching agent, a bleach activator, a chelating agent, a chlorine scavenger, an optical brightener, a bitterant, a corrosion inhibitor, and a combination thereof.

In some aspects, the detergent composition comprises surfactants comprising MES, AE, and at least one surfactant selected from a methyl ester ethoxylate, an alkyl ether sulfate, coco fatty acid, a linear alkylbenzene sulfonate, and a combination thereof;

- at least one additive selected from a base, a performance polymer, an enzyme, a defoamer, a chelating agent, an optical brightener, an anti-redeposition agent, a bitterant, a corrosion inhibitor, and a combination thereof; and
- a non-aqueous solvent comprising glycerin, propylene glycol, polyethylene glycol, and ethanol.

In some aspects, the water-soluble film material comprises polyvinyl alcohol (PVOH) or polyvinyl acetate (PVA).

DETAILED DESCRIPTION

Provided herein is a unit dose product comprising: a pouch formed from a water-soluble film material; a detergent composition comprising about 5 to about 20 weight percent (wt %) water, about 20 to about 65 combined wt % of at least two surfactants comprising a methyl ester sulfonate (MES) and an alcohol ethoxylate (AE), and a non-aqueous solvent; and wherein the detergent composition is disposed within the pouch.

Non-limiting examples of the various aspects are shown in the present disclosure.

Definitions

In order that the present disclosure can be more readily understood, certain terms are first defined. Additional definitions are set forth throughout the detailed disclosure.

All of the various aspects, embodiments, and options disclosed herein can be combined in any and all variants unless otherwise specified. Terms in this application control in the event of a conflict with a patent or publication term that is incorporated by reference.

As used herein, "a," "an," or "the" means one or more unless otherwise specified.

Furthermore, "and/or," where used herein, is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

Open terms such as “include,” “including,” “contain,” “containing” and the like mean “comprising.” The term “or” can be conjunctive or disjunctive.

It is understood that wherever aspects are described herein with the language “comprising,” otherwise analogous aspects described in terms of “consisting of” and/or “consisting essentially of” are also provided.

Some inventive embodiments contemplate numerical ranges. Every numerical range provided herein includes the range endpoints as individual inventive embodiments. When a numerical range is provided, all individual values and sub-ranges therein are present as if explicitly written out.

The term “about” includes the recited number ±10%. For example, “about 10” means 9 to 11.

The phrase “substantially free of” means that a composition contains little no specified ingredient/component, such as less than about 5 wt %, less than about 4 wt %, less than about 3 wt %, less than about 2 wt %, less than about 1 wt %, less than about 0.5 wt %, less than about 0.3 wt %, less than about 0.2 wt %, less than about 0.1 wt %, or about 0 wt % of the specified ingredient. In one aspect, the detergent composition is substantially free of linear alkylbenzene sulfonates (LAS).

As used herein, the “%” described in the present application refers to the weight percentage unless otherwise indicated.

The term “at least” prior to a number or series of numbers is understood to include the number adjacent to the term “at least,” and all subsequent numbers or integers that could logically be included, as clear from context. For example, “at least one enzyme” means that 1, 2, 3, or more enzymes are included in the composition. When at least is present before a series of numbers or a range, it is understood that “at least” can modify each of the numbers in the series or range. “At least” is also not limited to integers (e.g., “at least 5%” includes 5.0%, 5.1%, 5.18% without consideration of the number of significant figures).

Unless states otherwise, the term “by weight of the composition” refers to a composition of a final product derived from a process, unless otherwise defined.

The terms “process” and “method” can be used interchangeably.

The terms “alkoxylate” or “alkoxylated” as used in the present application means: the presence of an polyaliphatic ether moiety in a compound, such as ethoxylate ($—CH_2CH_2O—$) or propoxylate ($—CH(CH_3)CH_2O—$). A polyethoxylate is multiple repeat units of ethoxylate ($(—CH_2CH_2O—)_n$), and a polypropoxylate is multiple repeat units of propoxylate ($(—CH(CH_3)CH_2O—)_m$). The subscripts “n” and “m” are the same or different and each is an integer of 1 to 100 (e.g., 1 to 90, 1 to 80, 1 to 70, 1 to 60, 1 to 50, 1 to 40, 1 to 30, 1 to 20, 1 to 15, 1 to 14, 1 to 13, to 13, 1 to 12, 1 to 11, 1 to 10, 1 to 9, 1 to 8, 1 to 7, 1 to 6, 1 to 5, or 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100).

The terms “ethoxylate” or “ethoxylated” as used in the present application means the presence of multiple repeat units of ethoxylate ($(—CH_2CH_2O—)_n$). The subscript “n” is an integer of 1 to 100 (e.g., 1 to 90, 1 to 80, 1 to 70, 1 to 60, 1 to 50, 1 to 40, 1 to 30, 1 to 20, 1 to 15, 1 to 14, 1 to 13, to 13, 1 to 12, 1 to 11, 1 to 10, 1 to 9, 1 to 8, 1 to 7, 1 to 6, 1 to 5, or 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100).

The term “Zein score” or “Zein number” as used in the present application refers to a score or number measured using a Zein test (see, e.g., Gott, E., Aesthet. Medzin., Tenside 15:313 (1966)), as described in the examples. A Zein test determines the extent of denaturation of Zein corn protein after exposure to a surfactant for a given period of time. Generally, the higher the Zein score, the greater the skin irritation potential.

In some aspects, the detergent compositions described herein have a Zein score of less than about 2% dissolved zein when tested at a 3% dilution. In other aspects the detergent compositions described herein have a Zein score of less than 1% dissolved zein when tested at a 3% dilution. In other aspects, the detergent compositions described herein at a 3% dilution have a Zein score of from about 0.01% to about 2%, from about 0.01% to about 1.75%, about 0.01% to about 1.5%, or about 0.01% to about 1.25%, or about 0.01% to about 1% dissolved zein.

The term % swelling as used in the present application means the percent increase or decrease in weight, for example the weight of a pouch strip, such as a polyvinyl alcohol strip, following submersion in a detergent composition for a given period of time, for example twenty-four hours (hr). The % swelling is calculated as described in the examples by taking a post-soaking weight, subtracting an initial, pre-soaking weight, and dividing by the initial, pre-soaking weight.

In some aspects, the detergent composition described herein has a % swelling rate of not more than about 30% following a 24 hr test. In some aspects, the detergent composition described herein has a percent swelling from about 20% to about 30% following a 24 hr test, or about 21% to about 30%, about 22% to about 30%, about 23% to about 30%, about 24% to about 30%, about 25% to about 30%, about 26% to about 30%, about 27% to about 30%, about 28% to about 30%, or about 29% to about 30%.

Detergent Composition

In some aspects, the present disclosure is directed to a unit dose product comprising: a pouch formed from a water-soluble film material and a detergent composition disposed within the pouch, wherein the detergent composition comprises about 5 to about 20 weight percent (wt %) water, about 20 to about 65 combined wt % of at least two surfactants comprising a methyl ester sulfonate (MES) and an alcohol ethoxylate (AE), and a non-aqueous solvent.

It was discovered that a mild composition (i.e., a composition with a low Zein score) can be provided when a methyl ester sulfonate (MES) is used as a replacement for a linear alkylbenzene sulfonate in a detergent composition. In some aspects, the detergent composition has a Zein score that is not more than 2% dissolved zein when tested on a 3% dilution of the detergent composition when measured in accordance with the method set forth herein and in Gott (Aesthet. Medzin., Tenside 15:313 (1966)), the disclosure of which is incorporated herein by reference in its entirety. In some aspects, the detergent composition has a Zein score of not more than 1% dissolved zein when tested on a 3% dilution. In other aspects, the detergent composition has a Zein score of from about 0.01% to 2%, from about 0.01% to about 1.75%, about 0.01% to about 1.5%, or about 0.01% to about 1.25%, or about 0.01% to about 1% dissolved zein, when measured at a 3% dilution.

In some aspects, the detergent composition comprises from about 5 wt % to about 20 wt % of water relative to the total weight of the composition. For example, the water content can be present in an amount from about 5 wt % to about 18 wt %, about 5 wt % to about 15 wt %, about 5 wt % to about 12 wt %, about 5 wt % to about 10 wt %, about 6 wt % to about 20 wt %, about 6 wt % to about 18 wt %, about 6 wt % to about 15 wt %, about 6 wt % to about 12 wt %, about 6 wt % to about 10 wt %, about 7 wt % to about 20 wt %, about 7 wt % to about 18 wt %, about 7 wt % to about 15 wt %, about 7 wt % to about 12 wt %, about 7 wt % to about 10 wt %, about 8 wt % to about 20 wt %, about 8 wt % to about 18 wt %, about 8 wt % to about 15 wt %, about 8 wt % to about 12 wt %, about 8 wt % to about 10 wt %, about 9 wt % to about 20 wt %, about 9 wt % to about 18 wt %, about 9 wt % to about 15 wt %, about 9 wt % to about 12 wt %, about 20 wt %, about 19 wt %, about 18 wt %, about 17 wt %, about 16 wt %, about 15 wt %, about 14 wt %, about 13 wt %, about 12 wt %, about 11 wt %, about 10 wt %, about 9 wt %, about 8 wt %, about 7 wt %, about 6 wt %, or about 5 wt % of the total weight of the composition.

The detergent composition comprises at least one non-aqueous solvent in addition to water. In some aspects, the non-aqueous comprises an alcohol (e.g., a $C_{1-4}$ alcohol), a polyol (e.g., a diol, a triol, or higher, such as polyethylene glycol), or a combination thereof. Suitable examples of a solvent include, e.g., ethylene glycol, diethylene glycol, triethylene glycol, diethylene glycol monobutyl ether, propylene glycol, dipropylene glycol, tripropylene glycol, dipropylene glycol monobutyl ether, 1,3-butylene glycol, 1,4-butylene glycol, 1-(1-butoxy-2-propoxy)-2-propanol, 2-methyl-2,4-pentanediol, 1,5-pentanediol, 1,6-hexanediol, glycerin, polyethylene glycol, ethanol, or any combination thereof.

In some aspects, the at least one non-aqueous solvent comprises polyethylene glycol (PEG), which can have the structure:

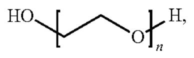

wherein n is an integer from 1 to 25 (e.g., 1 to 24, 1 to 23, 1 to 22, 1 to 21, 1 to 20, 1 to 18, 1 to 15, 1 to 12, 1 to 10, 2 to 25, 2 to 24 to 2 to 23, 2 to 22, 2 to 21, 2 to 20, 2 to 18, 2 to 15, 2 to 12, 2 to 10, 4 to 25, 4 to 23, 4 to 20, 4 to 18, 4 to 15, 4 to 12, 4 to 10, 7 to 25, 7 to 23, 7 to 20, 7 to 18, 7 to 15, 7 to 12, 7 to 10, 9 to 25, 9 to 23, 9 to 20, 9 to 18, 9 to 15, 9 to 12, etc.). In some aspects, n can be 1, 2, 3, 4, 5, 6, 7, 8, 9, 10, 11, 12, 13, 14, 15, 16, 17, 18, 19, 20, 21, 22, 23, 24, or 25.

In some aspects, the PEG has a molecular weight (including a number average molecular weight) of about 60 to about 1500 g/mol (e.g., about 60 to about 1200 g/mol, about 60 to about 1000 g/mol, about 100 to about 1500 g/mol, about 100 to about 1200 g/mol, about 100 to about 1000 g/mol, about 200 to about 1500 g/mol, about 200 to about 1200 g/mol, about 200 to about 1000 g/mol, about 300 to about 1500 g/mol, about 300 to about 1200 g/mol, about 300 to about 1000 g/mol, about 400 to about 1500 g/mol, about 400 to about 1200 g/mol, about 400 to about 1000 g/mol, about 200 g/mol, about 400 g/mol, about 600 g/mol, about 800 g/mol, or about 1000 g/mol).

In some aspects, the non-aqueous solvent comprises propylene glycol (PG). In some aspects, the non-aqueous solvent comprises glycerin.

In some aspects, the non-aqueous solvent comprises PEG, propylene glycol, and glycerin. In some aspects, the PEG, propylene glycol, and glycerin are present in a weight ratio of about 3-5:1:1. In some aspects, the non-aqueous solvent comprises PEG, propylene glycol, and glycerin in a weight ratio of about 3:1:1, about 3.5:1:1, about 4:1:1, about 4.5:1:1, or about 5:1:1.

In some aspects, the non-aqueous solvent comprises ethanol. In some aspects, the non-aqueous solvent comprises PEG, propylene glycol, glycerin, and ethanol.

To improve mildness, the detergent composition includes at least two surfactants comprising a methyl ester sulfonate (MES) and an alcohol ethoxylate (AE).

In some aspects, the methyl ester sulfonate (MES) is of the formula $R^1CH(C(=O)OR^2)SO_3X$, wherein $R^1$ is a $C_8$-$C_{18}$ alkyl, $R^2$ is $CH_3$ or X, and X is a cation that balances the charge. The $C_8$-$C_{18}$ alkyl group is an alkyl comprising 8 to 18 carbons (e.g., 8 to 16 carbons, 10 to 18 carbons, 10 to 16 carbons, 12 to 18 carbons, 12 to 16 carbons, such as $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl, $C_{17}$ alkyl, or $C_{18}$ alkyl). The cation, X, can be, for example, a cation with a +1 or +2 charge. Suitable examples of X include a Group I cation (e.g., sodium cation, potassium cation), a Group II cation (e.g., magnesium cation, calcium cation), an ammonium cation, or a combination thereof. In some aspects, X is Group I cation, such as a sodium cation. In an aspect, the MES comprises at least one of sodium methyl 2-sulfolaurate and disodium 2-sulfolaurate. In an aspect, the MES comprises both sodium methyl 2-sulfolaurate and disodium 2-sulfolaurate.

In general, the nonionic alcohol ethoxylate (AE) will have a chemical structure of formula (I):

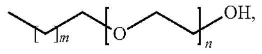

(I)

in which m is an integer of 10 to 16 (e.g., 10, 11, 12, 13, 14, 15, or 16) to form a $C_{12}$-$C_{18}$ fatty alkyl (e.g., $C_{12}$, $C_{13}$, $C_{14}$, $C_{15}$, $C_{16}$, $C_{17}$, and $C_{18}$), and n is an integer of 1 to 15 (e.g., 1, 2, 3, 4, 5, 6, 7, 8, 9, 10, 11, 12, 13, 14, or 15). The nonionic alcohol ethoxylate typically will contain a range of alkyl groups, such as $C_{12}$-$C_{15}$ or $C_{12}$-$C_{14}$ and can contain branches. In some aspects, the fatty alcohol ethoxylate can contain 1 to 15 moles (e.g., 1 to 12 moles, 1 to 9 moles, 1 to 7 moles, or about 7 moles) of ethoxylate per mole of alcohol. In some aspects, the fatty alcohol ethoxylate can be a $C_{12}$-$C_{18}$ fatty alcohol ethoxylate with 1-15 moles of ethoxylate. In some aspects, the fatty alcohol ethoxylate comprises a $C_{12}$-$C_{15}$ fatty alcohol ethoxylate with 7 moles of ethoxylate. In some aspects, the fatty alcohol ethoxylate comprises ethoxylated lauryl alcohol.

In some aspects, the detergent composition comprises MES and AE in an MES to AE weight ratio that is at least 0.5:1 (e.g., at least 0.6:1, at least 0.7:1, at least 0.8:1, at least 0.9:1, at least 1:1). In some aspects, the detergent composition comprises MES and AE in an MES to AE weight ratio that is from 0.5:1 to 1:2.5 (e.g., from 0.5:1 to 1:2.25, from 0.5:1 to 1:2, from 0.5:1 to 1:1.75, from 0.5:1 to 1:1.5, from 0.5:1 to 1:1, from 0.75:1 to 1:2.25, from 0.75:1 to 1:2, from 0.75:1 to 1:1.75, from 0.75:1 to 1:1.5, from 0.75:1 to 1:1, from 1:1 to 1:2.25, from 1:1 to 1:2, from 1:1 to 1:1.75, or from 1:1 to 1:1.5).

In some aspects, the at least two surfactants further comprise at least one (e.g., 1, 2, 3, 4, 5, or 6, etc.) additional surfactant, such as a coco fatty acid, an alkyl ether sulfate (AES), a linear alkylbenzene sulfonate (LAS), a nonionic surfactant, a cationic surfactant, or a combination thereof.

In some aspects, the additional surfactant comprises an alkyl ether sulfate (AES) (also called an alcohol ethoxysulfate). In general, the AES will have the structure $R^1$—O-$(EO)_nSO_3^-X^+$, in which $R^1$ is a $C_8$-$C_{18}$ alkyl group (linear or branched), EO is polyethoxylate, n is typically 1 to 8 (e.g., 1, 2, 3, 4, 5, 6, 7, or 8), and $X^+$ is a cation that balances the charge of the sulfonate. The $C_8$-$C_{18}$ alkyl group is an alkyl comprising 8 to 18 carbons (e.g., 8 to 16 carbons, 10 to 18 carbons, 10 to 16 carbons, 12 to 18 carbons, 12 to 16 carbons, such as $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl, $C_{17}$ alkyl, or $C_{18}$ alkyl). In some aspects, the cation $X^+$ can be of formula (I) and/or (II) is a Group I cation, such as sodium cation or potassium cation, particularly sodium cation. In some aspects, the AES is sodium laureth sulfate.

In some aspects, the additional surfactant comprises a linear alkylbenzene sulfonate (LAS). In some aspects, the LAS in the detergent composition is of Formula (I).

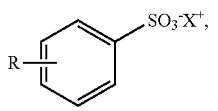

(I)

in which R is a linear $C_{10}$-$C_{18}$ (e.g., $C_{10}$, $C_{11}$, $C_{12}$, $C_{13}$, $C_{14}$, $C_{15}$, $C_{16}$, $C_{17}$, and $C_{18}$) alkyl, and $X^+$ is a cation that balances the charge of the sulfonate. The phenylsulfonate can be at any suitable position (e.g., at the 1-position, 2-position, 3-position, 4-position, 5-position, 6-position, 7-position, 8-position, or 9-position) on the alkyl R. With respect to the benzene ring, the alkyl R and sulfonate can be ortho, meta, or para to each other. In some aspects, the alkyl R and sulfonate are para to one another.

In some aspects, the detergent composition comprises an LAS to MES weight ratio that is between about 1:0.5 to about 1:3. For example, the LAS:MES weight ratio can be about 1:0.5 to about 1:2.75 (e.g., about 1:0.5 to about 1:2.5, about 1:0.5 to about 1:2.25, about 1:0.5 to about 1:2, about 1:0.5 to about 1:1.75, about 1:0.5 to about 1:1.5, about 1:0.5 to about 1:1.25, about 1:0.5 to about 1:1, about 1:0.5 to about 1:0.75, about 1:0.75 to about 1:3, about 1:1 to about 1:3, about 1:1.25 to about 1:3, about 1:1.5 to about 1:3, about 1:1.75 to about 1:3, about 1:2 to about 1:3, about 1:2.25 to about 1:3, about 1:2.5 to about 1:3, about 1:2.75 to about 1:3, about 1:0.5, about 1:0.6, about 1:0.7, about 1:0.8, about 1:0.9, about 1:1, about 1:1.1, about 1:1.2, about 1:1.3, about 1:1.4, about 1:1.5, about 1:1.6, about 1:1.7, about 1:1.8, about 1:1.9, about 1:2, about 1:2.1, about 1:2.2, about 1:2.3, about 1:2.4, about 1:2.5, about 1:2.6, about 1:2.7, about 1:2.8, about 1:2.9, or about 1:3).

In some aspects, the detergent composition does not comprise or is substantially free of a linear alkylbenzene sulfonate (LAS).

A cationic surfactant comprises a hydrophobic tail group (e.g., a linear aliphatic chain) and a cationic hydrophilic head group. The hydrophobic tail group can be a $C_8$-$C_{18}$ aliphatic ("fatty") group that contains 0 or 1 double bond and can be optionally substituted with one or more (e.g., 1, 2, 3, or 4) substituents selected from an aryl group (e.g., phenyl, benzyl, naphthyl) or alkyl. The cationic hydrophilic group can be, for example, an amino group that can be quaternized, such as trialkylammonium. The counterion can be any suitable anion that can balance the charge. In some aspects, the counterion is an anion with a −1 charge (e.g., $X^-$), such as a halide (e.g., chloride, bromide, etc.), hydroxy, or tosylate.

In some aspects, the cationic surfactant can be alkoxylated, in which polyalkylene glycol (e.g., polyethylene glycol, polypropylene glycol) repeat units can be disposed between the hydrophobic tail group (e.g., a fatty group) and hydrophilic head group.

Examples of an alcohol alkoxylate include, e.g., $C_8$-$C_{18}$ ethoxylate and $C_8$-$C_{18}$ propoxylate. Examples of a fatty acid alkoxylate include, e.g., $R^1$—C(O)O-EO—H, in which $R^1$ is a $C_8$-$C_{18}$ alkyl group and EO is polyethoxylate. Examples of an alkyl phenol ethoxylate include, e.g., $R^1$-phenyl-O (EO)—H, in which $R^1$ is a $C_8$-$C_{18}$ alkyl group and EO is polyethoxylate. Examples of an alkoxylated amine include, e.g., ethoxylated $C_8$-$C_{18}$ alkylamine, tallow amine ethoxylate, lauryl amine ethoxylate ether, 2-2-(2-hydroxyethoxy) ethylaminoethanol, bis(hydroxyethoxyethyl)amine, 2,2'-((2-(2-hydroxyethoxy)ethyl) azanediyl) diethanol, and coco bis (2-hydroxyethyl)amine. Example of an alkyl glucoside include, e.g., alkyl polyglucoside, such as $C_8$-$C_{18}$ polyglucoside which can include 1 to 3 glucoside units. Examples of a fatty amide alkoxylate include $R^1$—C(O)NH-(EO)—H, in which $R^1$ is a $C_8$-$C_{18}$ alkyl group and EO is polyethoxylate. Examples of a diester of alkoxylated fatty acid include, e.g., $R^1$—C(O)O-EO—C(O)—$R^{1'}$, in which $R^1$ and $R^{1'}$ is a $C_8$-$C_{18}$ alkyl group and EO is polyethoxylate. Examples of an alkoxylated methyl ester of fatty acid (e.g., a methyl ester ethoxylate) include e.g., $R^1$—C(O)O-EO-$R^2$, in which $R^1$ is a $C_8$-$C_{18}$ alkyl group, $R^2$ is a $C_1$-$C_4$ alkyl group, and EO is polyethoxylate. Examples of a glycerol fatty ester include, e.g., an ester formed from glycerol and a fatty acid (e.g., $C_8$-$C_{18}$ alkyl), such as 2-ethylhexyl oleate, glycerol trioleate, glyceryl monooleate, glyceryl monotallate, n-butyl stearate, neopentylglycol dioleate, pentaerythritol monooleate, pentaerythritol tetraoleate, and trimethylolpropane trioleate. An example of a castor oil alkoxylate is polyethoxylated castor oil. Examples of an ethylene oxide-propylene oxide block copolymer include, e.g., $R^3O$-$(EO)_n$—$(PO)_m$-$(EO)_n$—$R^4$, in which $R^3$ and $R^4$ are the same or different and each is a $C_1$-$C_7$ alkyl, a $C_5$-$C_6$ cycloalkyl, or an aryl; n is an integer of 30-150 (e.g., about 40-135, about 42-133), and m is an integer of about 10-100 (e.g., about 10-80, about 20-70, about 21-68) and block copolymers such as, PEO-PPO-PEO and PPO-PEO-PPO. Examples of a phenol alkoxylate include, e.g., $R^5$—$C_6H_4$-(EO)—H, wherein $R^5$ is hydrogen or a $C_1$-$C_{18}$ alkyl group, and EO is polyethoxylate, such as octyphenol ethoxylate, nonylphenol ethoxylate, 2-phenoxydecan-1-ol, bisphenol ethoxylate, and a styrenated phenol ethoxylate (e.g., tristyrylphenol ethoxylate). In any of the foregoing examples, the $C_8$-$C_{18}$ alkyl group is an alkyl comprising 8 to 18 carbons (e.g., 8 to 16 carbons, 10 to 18 carbons, 10 to 16 carbons, 12 to 18 carbons, 12 to 16 carbons, such as $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl, $C_{17}$ alkyl, or $C_{18}$ alkyl).

In some aspects, the at least one additional surfactant comprises a methyl ester ethoxylate, an alcohol alkoxylate, a fatty acid alkoxylate, an alkyl phenol ethoxylate, an alkoxylated amine, an alkyl glucoside, a fatty amide alkoxylate, a diester of alkoxylated fatty acid, a glycerol fatty ester, castor oil alkoxylate, an ethylene oxide-propylene oxide block copolymer, a phenol alkoxylate, or a combination thereof.

In some aspects, the at least one additional surfactant comprises a methyl ester ethoxylate (MEE) of the formula: $R^1$—C(═O)O-(EO)$_n$—$CH_3$, wherein $R^1$ is a $C_8$-$C_{24}$ alkyl group, EO is polyethoxylate, and n is an integer of moles from 5 to 30 (i.e., n is 5, 6, 7, 8, 9, 10, 11, 12, 13, 14, 15, 16, 17, 18, 19, 20, 21, 22, 23, 24, 25, 26, 27, 28, 29, or 30). The $C_8$-$C_{24}$ alkyl group is an alkyl comprising 8 to 24 carbons (e.g., 8 to 22 carbons, 8 to 20 carbons, 8 to 18 carbons, 8 to 16 carbons, 10 to 24 carbons, 10 to 22 carbons, 10 to 20 carbons, 10 to 18 carbons, 10 to 16 carbons, 12 to 24 carbons, 12 to 22 carbons, 12 to 20 carbons, 12 to 18 carbons, 12 to 16 carbons, such as $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl, $C_{17}$ alkyl, $C_{18}$ alkyl, $C_{19}$ alkyl, $C_{20}$ alkyl, $C_{21}$ alkyl, $C_{22}$ alkyl, $C_{23}$ alkyl, or $C_{24}$ alkyl). In some aspects, the MEE is of formula $R^1$—C(═O)O-(EO)$_n$—$CH_3$, in which $R^1$ is $C_{17}$ alkyl, and n is 10.

In some aspects, the at least one additional surfactant comprises a nonionic alcohol ethoxylate (AE) as a nonionic surfactant. In general, the nonionic alcohol ethoxylate will have a chemical structure of formula (I):

(I)

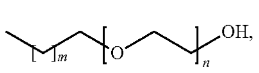

in which m is an integer of 10 to 16 (e.g., 10, 11, 12, 13, 14, 15, or 16) to form a $C_{12}$-$C_{18}$ fatty alkyl (e.g., $C_{12}$, $C_{13}$, $C_{14}$, $C_{15}$, $C_{16}$, $C_{17}$, and $C_{18}$), and n is an integer of 1 to 15 (e.g., 1, 2, 3, 4, 5, 6, 7, 8, 9, 10, 11, 12, 13, 14, or 15). The nonionic alcohol ethoxylate typically will contain a range of alkyl groups, such as $C_{12}$-$C_{15}$ or $C_{12}$-$C_{14}$ and can contain branches. In some aspects, the fatty alcohol ethoxylate can contain 1 to 15 moles (e.g., 1 to 12 moles, 1 to 9 moles, 1 to 7 moles, or about 7 moles) of ethoxylate per mole of alcohol. In some aspects, the fatty alcohol ethoxylate can be a $C_{12}$-$C_{18}$ fatty alcohol ethoxylate with 1-15 moles of ethoxylate. In some aspects, the fatty alcohol ethoxylate comprises a $C_{12}$-$C_{15}$ fatty alcohol ethoxylate with 7 moles of ethoxylate. In some aspects, the fatty alcohol ethoxylate comprises ethoxylated lauryl alcohol.

A nonionic surfactant comprises a hydrophobic tail group (e.g., a linear aliphatic chain) and an uncharged (i.e., neutral) hydrophilic head group. The hydrophobic tail group can be a $C_8$-$C_{18}$ aliphatic ("fatty") group that contains 0 or 1 double bond and can be optionally substituted with one or more (e.g., 1, 2, 3, or 4) substituents selected from an aryl group (e.g., phenyl, benzyl, naphthyl) or alkyl. The uncharged hydrophilic group can be, for example, an alkoxylate, such as ethoxylate ((—$CH_2CH_2O$—)$_n$; EO or PEO) or propoxylate ((—$CH(CH_3)CH_2O$—)$_m$; PO or PPO), in which n and m are the same or different and each is an integer of 1 to 100 (e.g., 1 to 90, 1 to 80, 1 to 70, 1 to 60, 1 to 50, 1 to 40, 1 to 30, 1 to 20, 1 to 15, 1 to 14, 1 to 13, to 13, 1 to 12, 1 to 11, 1 to 10, 1 to 9, 1 to 8, 1 to 7, 1 to 6, 1 to 5, or 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, or 100).

In some aspects, the cationic surfactant can be a fatty amine salt or a quaternary ammonium compound. In some aspects, the cationic surfactant comprises a fatty amine salt, a fatty diamine salt, a coco amine alkoxylate, an alkoxylated amine, an alkoxylated diamine, fatty quaternary ammonium compound, a fatty amide quaternary ammonium compound, an alkoxylated quaternary ammonium compound, a benzalkyl quaternary ammonium compound, or a combination thereof. Examples of the fatty amine salt include, e.g., a $C_8$-$C_{18}$ fatty amine salt (e.g., $R^1$—$NH_3^+$, in which $R^1$ is a $C_8$-$C_{18}$ alkyl group). Examples of a fatty diamine salt include, e.g., $R^1$—$NH_2^+$—$R^2$—$NH_3^+$, in which $R^1$ is a $C_8$-$C_{18}$ alkyl group and $R^2$ is a $C_{1-6}$ alkyl). Examples of an alkoxylated amine and an alkoxylated diamine include a polyethoxylated fatty amine and diamine, respectively. Examples of a fatty quaternary ammonium compound include, e.g., $R^1$—$NR^3{}_{3^+}$, in which $R^1$ is a $C_8$-$C_{18}$ alkyl group and each $R^3$ is a $C_{1-4}$ alkyl, phenyl, or benzyl (e.g., alkyltrimethylammonium halide, alkyltrimethylammonium tosylate, alkyltrimethylammonium hydroxide). Examples of a fatty amide quaternary ammonium compound include, e.g., $R^1$—C(O)N—$R^2$—$NR^3{}_{3^+}$, in which $R^1$ is a $C_8$-$C_{18}$ alkyl group, $R^2$ is a $C_{1-6}$ alkyl, and each $R^3$ is a $C_{1-4}$ alkyl, phenyl, or benzyl (e.g., trimethylammonium stearamide). Examples of an alkoxylated quaternary ammonium compound include, e.g., a polyethoxylated quaternary ammonium compound. Examples of a benzalkyl quaternary ammonium compound include, e.g., benzyl-$C_8$-$C_{18}$ alkyldimethylammonium (e.g., benzalkonium chloride). In any of the foregoing examples, the $C_8$-$C_{18}$ alkyl group is an alkyl comprising 8 to 18 carbons (e.g., 8 to 16 carbons, 10 to 18 carbons, 10 to 16 carbons, 12 to 18 carbons, 12 to 16 carbons, such as $C_8$ alkyl, $C_9$ alkyl, $C_{10}$ alkyl, $C_{11}$ alkyl, $C_{12}$ alkyl, $C_{13}$ alkyl, $C_{14}$ alkyl, $C_{15}$ alkyl, $C_{16}$ alkyl, $C_{17}$ alkyl, or $C_{18}$ alkyl).

In some aspects, the detergent composition comprises from about 20 wt % to about 65 wt % of at least two surfactants comprising a methyl ester sulfonate (MES) and an alcohol ethoxylate (AE), and can, in some aspects, further comprise a coco fatty acid, a linear alkylbenzene sulfonate (LAS), a nonionic surfactant, a cationic surfactant, or a combination thereof, relative to the total weight of the composition. For example, the total surfactant content can be present in an amount from about 20 wt % to about 65 wt %, about 20 wt % to about 60 wt %, about 20 wt % to about 58 wt %, about 20 wt % to about 55 wt %, about 20 wt % to about 52 wt %, about 20 wt % to about 50 wt %, about 20 wt % to about 48 wt %, about 20 wt % to about 45 wt %, about 20 wt % to about 42 wt %, about 20 wt % to about 40 wt %, about 20 wt % to about 35 wt %, about 20 wt % to about 30 wt %, about 20 wt % to about 25 wt %, about 25 wt % to about 65 wt %, about 25 wt % to about 60 wt %, about 25 wt % to about 58 wt %, about 25 wt % to about 55 wt %, about 25 wt % to about 52 wt %, about 25 wt % to about 50 wt %, about 25 wt % to about 48 wt %, about 25 wt % to about 45 wt %, about 25 wt % to about 42 wt %, about 25 wt % to about 40 wt %, about 25 wt % to about 35 wt %, about 25 wt % to about 30 wt %, about 28 wt % to about 65 wt %, about 28 wt % to about 60 wt %, about 28 wt % to about 58 wt %, about 28 wt % to about 55 wt %, about 28 wt % to about 52 wt %, about 28 wt % to about 50 wt %, about 28 wt % to about 48 wt %, about 28 wt % to about 45 wt %, about 28 wt % to about 42 wt %, about 28 wt % to about 40 wt %, about 28 wt % to about 35 wt %, about 28 wt % to about 30 wt %, about 30 wt % to about 65 wt %, about 30 wt % to about 60 wt %, about 30 wt % to about 58 wt %, about 30 wt % to about 55 wt %, about 30 wt % to about 52 wt %, about 30 wt % to about 50 wt %, about 30 wt % to about 48 wt %, about 30 wt % to about 45 wt %, about 30 wt % to about 42 wt %, about 30 wt % to about 40 wt %, about 30 wt % to about 35 wt %, about 32 wt % to about 65 wt %, about 32 wt % to about 60 wt %, about 32 wt % to about 58 wt %, about 32 wt % to about 55 wt %, about 32 wt % to about 52 wt %, about 32 wt % to about 50 wt %, about 32 wt % to about 48 wt %, about 32 wt % to about 45 wt %, about 32 wt % to about 42 wt %, about 32 wt % to about 40 wt %, about 32 wt % to about 35 wt %, about 35 wt % to about 60 wt %, about 35 wt % to about 58 wt %, about 35 wt % to about 55 wt %, about 35 wt % to about 52 wt %, about 35 wt % to about 50 wt %, about 35 wt % to about 48 wt %, about 35 wt % to about 45 wt %, about 35 wt % to about 42 wt %, about 35 wt % to about 40 wt %, about 38 wt % to about 65 wt %, about 38 wt % to about 60 wt %, about 38 wt % to about 58 wt %, about 38 wt % to about 55 wt %, about 38 wt % to about 52 wt %, about 38 wt % to about 50 wt %, about 38 wt % to about 48 wt %, about 38 wt % to about 45 wt %, about 38 wt % to about 42 wt %, about 38 wt % to about 40 wt %, about 40 wt % to about 65 wt %, about 40 wt % to about 60 wt %, about 40 wt % to about 58 wt %, about 40 wt % to about 55 wt %, about 40 wt % to about 52 wt %, about 40 wt % to about 50 wt %, about 40 wt % to about 48 wt %, about 40 wt % to about 45 wt %, about 40 wt % to about 42 wt %, about 42 wt % to about 65 wt %, about 42 wt % to about 60 wt %, about 42 wt % to about 58 wt %, about 42 wt % to about 55 wt %, about 42 wt % to about 52 wt %, about 42 wt % to about 50 wt %, about 42 wt % to about 48 wt %, about 42 wt % to about 45 wt %, about 45 wt % to about 65 wt %, about 45 wt % to about 60 wt %, about 45 wt % to about 58 wt %, about 45 wt % to about 55 wt %, about 45 wt % to about 52 wt %, about 45 wt % to about 50 wt %, about 45 wt % to about 48 wt %, about 48 wt % to about 65 wt %, about 48 wt % to about 60 wt %, about 48 wt % to about 58 wt %, about 48 wt % to about 55 wt %, about 48 wt % to about 52 wt %, about 48 wt % to about 50 wt %, about 50 wt % to about 65 wt %, about 50 wt % to about 60 wt %, about 50 wt % to about 58 wt %, about 50 wt % to about 55 wt %, about 50 wt % to about 52 wt %, about 52 wt % to about 65 wt %, about 52 wt % to about 60 wt %, about 52 wt % to about 58 wt %, about 52 wt % to about 55 wt %, about 55 wt % to about 65 wt %, about 55 wt % to about 60 wt %, about 55 wt % to about 58 wt %, about 58 wt % to about 65 wt %, about 58 wt % to about 60 wt %, about 60 wt % to about 65 wt %, about 65 wt %, about 64 wt %, about 63 wt %, about 62 wt %, about 61 wt %, about 60 wt %, about 59 wt %, about 58 wt %, about 57 wt %, about 56 wt %, about 55 wt %, about 54 wt %, about 53 wt %, about 52 wt %, about 51 wt %, about 50 wt %, about 49 wt %, about 48 wt %, about 47 wt %, about 46 wt %, about 45 wt %, about 44 wt %, about 43 wt %, about 42 wt %, about 41 wt %, about 40 wt %, about 39 wt %, about 38 wt %, about 37 wt %, about 36 wt %, or about 35 wt % of the total weight of the composition.

In some aspects, the MES surfactant can be present in an amount from about 5 wt % to about 20 wt % (e.g., about 5 wt % to about 18 wt %, about 5 wt % to about 15 wt %, about 5 wt % to about 12 wt %, about 5 wt % to about 10 wt %, about 10 wt % to about 20 wt %, about 10 wt % to about 18 wt %, about 10 wt % to about 15 wt %, about 12 wt % to about 20 wt %, about 12 wt % to about 18 wt %, about 12 wt % to about 17 wt %, about 13 wt % to about 17 wt %, about 13 wt % to about 15 wt %, about 14 wt % to about 15 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, of the total weight of the composition. In a particular aspect, the detergent composition comprises about 5 wt %, about 12 wt %, or about 15 wt % of MES.

In some aspects, the AE surfactant can be present in an amount from about 15 wt % to about 30 wt % (e.g., about 15 wt % to about 25 wt %, about 15 wt % to about 20 wt %, about 18 wt % to about 30 wt %, about 18 wt % to about 25 wt %, about 20 wt % to about 30 wt %, about 20 wt % to about 25 wt %, about 22 wt % to about 30 wt %, about 22 wt % to about 25 wt %, about 25 wt % to about 30 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, or about 30 wt %, of the total weight of the composition. In a particular aspect, the detergent composition comprises about 23 wt % of AE.

In some aspects, the detergent composition can have a pH of about 6.5 to about 12 (e.g., about 7 to about 12, about 7.5 to 12, about 8 to about 12, about 8.5 to 12, about 9 to about 12, about 9.5 to about 12, about 10 to about 12, about 10.5 to about 12, about 11 to about 12, about 11.5 to about 12, about 6.5 to about 11, about 7 to about 11, about 7.5 to about 11, about 8 to about 11, about 8.5 to about 11, about 9 to about 11, about 9.5 to about 11, about 10 to about 11, about 6.5 to about 10, about 7 to about 10, about 7.5 to about 10, about 8 to about 10, about 8.5 to about 10, about 9 to about 10, about 9.5 to about 10, about 6.5 to about 9, about 7 to about 9, about 7.5 to about 9, about 8 to about 9, about 8.5 to about 9). In some aspects, the detergent composition has a pH of greater than 7 (e.g., about 7.1, about 7.2, about 7.3, about 7.4, about 7.5, about 7.6, about 7.7, about 7.8, or about 7.9) or greater. In some aspects, the detergent composition has a pH of about 8 to about 9. In some aspects, the detergent composition has a pH of about 7.1, about 7.2, about 7.3, about 7.4, about 7.5, about 7.6, about 7.7, about 7.8, about 7.9, about 8, about 8.1, about 8.2, about 8.3, about 8.4, about 8.5, about 8.6, about 8.7, about 8.8, about 8.9, about 9, about 9.1, about 9.2, about 9.3, about 9.4, about 9.5, about 9.6, about 9.7, about 9.8, about 9.9, about 10, about 10.1, about 10.2, about 10.3, about 10.4, about 10.5, about 10.6, about 10.7, about 10.8, about 10.9, about 11.1, about 11.2, about 11.3, about 11.4, about 11.5, about 11.6, about 11.7, about 11.8, about 11.9, or about 12. In some aspects, the detergent composition has a pH of about 7 to about 8.

In some aspects, the detergent composition comprises a base to adjust the pH. The base can be any suitable compound with a pKb of about 1 to about 13. In some aspects, the base can be a Group I hydroxide, a Group II hydroxide, monoethanolamine, diethanolamine, triethanolamine, methyl diethanolamine, sodium tetraborate, trisodium phosphate, sodium carbonate, or a combination thereof. In other aspects, the base is a Group I hydroxide, a Group II hydroxide, sodium tetraborate, trisodium phosphate, sodium carbonate, or a combination thereof. In some aspects, the base can be a monoethanolamine, sodium carbonate, or Group I hydroxide (e.g., sodium hydroxide, potassium hydroxide, or a combination of both). In some aspects, the detergent composition comprises monoethanolamine.

In some aspects, the detergent composition comprises from about 0.1 wt % to about 15 wt % of base (e.g., a Group I hydroxide, monoethanolamine) relative to the total weight of the composition. For example, the acid can be present in an amount from about 0.1 wt % to about 12 wt %, about 0.1 wt % to about 10 wt %, about 0.5 wt % to about 15 wt %, about 0.5 wt % to about 12 wt %, about 0.5 wt % to about 10 wt %, about 1 wt % to about 15 wt %, about 1 wt % to about 14 wt %, about 1 wt % to about 13 wt %, about 1 wt % to about 12 wt %, about 1 wt % to about 11 wt %, about 1 wt % to about 10 wt %, about 1 wt % to about 9 wt %, about 1 wt % to about 8 wt %, about 1 wt % to about 5 wt %, about 1 wt % to about 3 wt %, about 1.5 wt % to about 15 wt %, about 1.5 wt % to about 10 wt %, about 1.5 wt % to about 8 wt %, about 1.5 wt % to about 5 wt %, about 1.5 wt % to about 3 wt %, about 2 wt % to about 15 wt %, about 2 wt % to about 10 wt %, about 2 wt % to about 8 wt %, about 2 wt % to about 5 wt %, about 2 wt % to about 3 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 11 wt %, about 12 wt %, about 13 wt %, about 14 wt %, or about 15 wt % of the total weight of the composition. In some aspects, the detergent composition comprises from about 0.5 wt % to about 5 wt % or from about 1 to about 3 wt % of base. In some aspects, the detergent composition comprises not more than 2 wt % monoethanolamine.

To help maintain the pH, in some aspects, the composition can further comprise an acid, which is any suitable compound with a pKa of less than about 10. In some aspects, the acid is an inorganic acid or an organic acid. Examples of an inorganic acid include hydrochloric acid, nitric acid, nitrous acid, sulfuric acid, sulfurous acid, phosphoric acid, boric acid, hydrobromic acid, hydroiodic acid, perchloric acid, and combinations thereof. In some aspects, the acid is a weak acid such that the acid has a pKa of 2 or greater (e.g., pKa is about 2 to about 10). Examples of a weak acid include, e.g., an organic acid or carbonic acid, hydrocyanic acid, phosphoric acid, sulfurous acid, nitrous acid, or a combination thereof.

In some aspects, the acid in the detergent composition is an organic acid, which in some instances can additionally act as a chelating agent. The organic acid can contain one or more (e.g., 1, 2, or 3) carboxylic acid groups, which can be used singly or in combination. For example, monocarboxylic acids include formic acid, acetic acid, propionic acid, butanoic acid, quinic acid, shikimic acid, lactic acid, sorbic acid, caproic acid, capyrylic acid, capric acid, lauric acid, and stearic acid. Di- and tricarboxylic acids include citric acid, isocitric acid, cis-aconitic acid, adipic acid, gluconic acid, glutaric acid, itaconic acid, ascorbic acid, succinic acid, malonic acid, malic acid, maleic acid, fumaric acid, tartaric acid, and oxalic acid. In some aspects, the detergent composition comprises citric acid.

In some aspects, the detergent composition comprises from about 0.1 wt % to about 10 wt % of acid (e.g., an organic acid, such as citric acid) relative to the total weight of the composition. For example, the acid can be present in an amount about 0.5 wt % to about 10 wt %, about 1 wt % to about 10 wt %, about 1 wt % to about 9 wt %, about 1 wt % to about 8 wt %, about 1 wt % to about 5 wt %, about 1 wt % to about 3 wt %, about 1.5 wt % to about 10 wt %, about 1.5 wt % to about 8 wt %, about 1.5 wt % to about 5 wt %, about 1.5 wt % to about 3 wt %, about 2 wt % to about 10 wt %, about 2 wt % to about 8 wt %, about 2 wt % to about 5 wt %, about 2 wt % to about 3 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt % of the total weight of the composition.

In some aspects, the detergent composition further comprises at least one additive. For example, the at least one (e.g., 1, 2, 3, 4, 5, or 6, etc.) additive can be selected from a base, an anti-redeposition agent, a performance polymer, a defoamer, an enzyme, a bleaching agent, a bleach activator, a chelating agent, a chlorine scavenger, an optical brightener, a bitterant, a corrosion inhibitor, and any combination thereof.

In some aspects, the detergent composition comprises from about 1 wt % to about 15 wt % of a total amount of additives relative to the total weight of the composition. For example, the total amount of additives can be from about 1 wt % to about 12 wt %, about 1 wt % to about 10 wt %, about 1 wt % to about 8 wt %, about 1 wt % to about 5 wt %, about 1 wt % to about 3 wt %, about 1.5 wt % to about 15 wt %, about 1.5 wt % to about 12 wt %, about 1.5 wt % to about 10 wt %, about 1.5 wt % to about 8 wt %, about 1.5 wt % to about 5 wt %, about 1.5 wt % to about 3 wt %, about 2 wt % to about 15 wt %, about 2 wt % to about 12 wt %, about 2 wt % to about 10 wt %, about 2 wt % to about 8 wt %, about 2 wt % to about 5 wt %, about 2 wt % to about 3 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 10.5 wt %, about 11 wt %, about 11.5 wt %, about 12 wt %, about 12.5 wt %, about 13 wt %, about 13.5 wt %, about 14 wt %, about 14.5 wt %, or about 15 wt % of the total weight of the composition.

In some aspects, the detergent composition comprises a performance polymer that improves at least one aspect of a washed textile. In some aspects, the performance polymer improves the cleaning action of the detergent composition, removes or reduces stains, maintains whiteness, protects color, protects the integrity of a textile, provides odor control, or any combination thereof. In some aspects the performance polymer comprises polyethyleneimine ethoxylate, polyethyleneimine ethoxylate propoxylate, a polycarboxylate (e.g., an acrylic homopolymer or copolymer), carboxymethylcellulose, a polyester, polyvinyl pyrrolidone, a copolymer comprising terephthalic acid, a copolymer comprising maleic acid, a copolymer comprising acrylamino tertiary butyl sulfonate, or any combination thereof. In some aspects the performance polymer comprises polyethyleneimine ethoxylate, polyethyleneimine ethoxylate propoxylate, or a combination of both.

In some aspects, the detergent composition comprises from about 1 wt % to about 10 wt % of a performance polymer relative to the total weight of the composition. For example, the performance polymer can be from about 1 wt % to about 8 wt %, about 1 wt % to about 5 wt %, about 1 wt % to about 3 wt %, about 1.5 wt % to about 10 wt %, about 1.5 wt % to about 8 wt %, about 1.5 wt % to about 5 wt %, about 1.5 wt % to about 3 wt %, about 2 wt % to about 10 wt %, about 2 wt % to about 8 wt %, about 2 wt % to about 5 wt %, about 2 wt % to about 3 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt % of the total weight of the composition.

In some aspects, the detergent composition comprises an anti-redeposition agent that keeps dissolved soil stains stable in the wash water and prevent the stains from redepositing on a textile. In some aspects, the anti-redeposition polymer is biodegradable. The anti-redeposition polymer can be based on acrylic acid, e.g., a homopolymer of acrylic acid, a polycarboxylate based on acrylic acid, a copolymer of acrylic acid and polystyrene, or a copolymer of maleic acid and acrylic acid. Examples of a suitable anti-redeposition polymer include, e.g., sodium polyacrylate, modified polyethylene glycol, styrene-acrylic acid copolymer, polyethyleneimine, or a combination thereof. In some aspects, the anti-redeposition polymer comprises sodium polyacrylate.

In some aspects, the detergent composition comprises from about 0.001 wt % to about 5 wt % of an anti-redeposition polymer relative to the total weight of the composition. For example, the anti-redeposition polymer can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises a defoamer that helps maintain the rise of foam, which can, in some aspects, avoid high foaming or water spilling from a washing machine. In general, the defoamer has a low viscosity. In some aspects the defoamer comprises coconut fatty acid, a silicone, ethylene-bis-stearamide, a fatty acid, a fatty alcohol, or any combination thereof. In an aspect, the defoamer is coconut fatty acid.

In some aspects, the detergent composition comprises from about 1 wt % to about 18 wt % of a defoamer relative to the total weight of the composition. For example, the defoamer can be from about 1 wt % to about 15 wt %, about 1 wt % to about 12 wt %, about 1 wt % to about 10 wt %, about 1 wt % to about 8 wt %, about 1 wt % to about 5 wt %, about 1 wt % to about 3 wt %, about 1.5 wt % to about 10 wt %, about 1.5 wt % to about 8 wt %, about 1.5 wt % to about 5 wt %, about 1.5 wt % to about 3 wt %, about 2 wt % to about 10 wt %, about 2 wt % to about 8 wt %, about 2 wt % to about 5 wt %, about 2 wt % to about 3 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, about 10 wt %, about 11 wt %, about 12 wt %, about 13 wt %, about 14 wt %, about 15 wt %, about 16 wt %, about 17 wt %, or about 18 wt %, of the total weight of the composition. In some aspects, the detergent composition comprises from about 3 wt % to about 10 wt % of a defoamer (e.g., coconut fatty acid) relative to the total weight of the composition.

In some aspects, the detergent composition comprises an enzyme to aid in removing stains, including protein stains, oil stains, tannin stains, starch stains, and dyes. For example, a protease is capable of breaking down protein-based stains, such as sweat, blood, mud, and dairy products. An amylase is capable of breaking down a starch-based stain, such as cornstarch or potato starch. A lipase is capable of breaking down fats. A mannanase is capable of breaking down guar and locust bean stains. In some aspects, the at least one enzyme is a hydrolytic enzyme. The at least one enzyme can comprise a protease, an amylase, a mannanase, a lactase, a lipase, a perhydrolase, an oxidoreductase, an endocellulase, an exocellulase, or a combination thereof. In some aspects, the detergent composition comprises a protease, an amylase, a mannanase, or a combination thereof.

In some aspects, the detergent composition comprises a total from about 0.01 wt % to about 5 wt % of at least one enzyme (e.g., a protease, an amylase, a mannanase, or a combination thereof) relative to the total weight of the composition. For example, the total enzyme content can from about 0.01 wt % to about 4 wt %, about 0.01 wt % to about 3 wt %, about 0.01 wt % to about 2 wt %, about 0.01 wt % to about 1 wt %, about 0.05 wt % to about 5 wt %, about 0.05 wt % to about 4 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.5 wt % to about 5 wt %, about 0.5 wt % to about 3 wt %, about 0.5 wt % to about 2 wt %, about 0.5 wt % to about 1 wt %, about 1 wt % to about 5 wt %, about 1 wt % to about 4 wt %, about 1 wt % to about 3 wt %, about 1 wt % to about 2 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3 wt %, about 3.1 wt %, about 3.2 wt %, about 3.3 wt %, about 3.4 wt %, about 3.5 wt %, about 3.6 wt %, about 3.7 wt %, about 3.8 wt %, about 3.9 wt %, about 4 wt %, about 4.2 wt %, about 4.5 wt %, about 4.8 wt %, or about 5 wt % of the total weight of the composition.

In some aspects, the detergent composition comprises a bleaching agent (e.g., chlorine or oxygen-releasing bleaching agents) and optionally a bleach activator. In some aspects, the bleaching agent comprises a hydrogen peroxide source as an oxygen-releasing bleaching agent. In some aspects, the hydrogen peroxide source comprises at least one inorganic perhydrate salt comprising a perborate salt, a percarbonate salt, a perphosphate salt, a persulfate salt, a persilicate salt, or a combination thereof. These salts can be counterbalanced by a Group I cation and/or Group II cation (e.g., sodium cation) to form, for example, an alkali metal percarbonate. In some aspects, the at least one inorganic perhydrate salt comprises sodium percarbonate.

In some aspects, the detergent composition comprises from about 0.001 wt % to about 5 wt % of a bleaching agent relative to the total weight of the composition. For example, the bleaching agent can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises a bleach activator, which is any suitable compound that enables the release of oxygen from the bleaching agent. Examples of the bleach activator include, e.g., tetraacetylethylenediamine (TAED), sodium 3,5,5-tri-methyl hexanoyloxybenzene sulfonate (iso-NOBS), sodium nonanoyloxybenzene sulfonate (NOBS), sodium acetoxybenzene sulfonate (ABS), and pentaacetyl glucose. Bleach activators are described in U.S. Pat. No. 6,551,982, the disclosure of which is incorporated herein by reference in its entirety. In some aspects, the detergent composition comprises a bleaching agent (e.g., sodium percarbonate) and a bleach activator (e.g., tetraacetylethylenediamine (TAED)).

In some aspects, the detergent composition comprises from about 0.001 wt % to about 5 wt % of a bleach activator relative to the total weight of the composition. For example, the bleach activator can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, when a bleaching agent is present, a bleach catalyst can be further present in the detergent composition. The bleach catalyst can be a transition metal-containing catalyst, such as a Mn, Fe, Co, Ru, or Mo salen complexes or carbonyl complexes or Mn-, Fe-, Co-, Ru-, Mo-, Ti-, V-, and Cu-complexes with N-containing tripod ligands or Co-, Fe-Cu-, and Ru-ammine complexes.

Complexes of manganese in oxidation stage II, III, IV, or IV are particularly used and which contain one or more macrocyclic ligands with the donor functions N, NR, PR, O, and/or S. For example, a manganese-containing catalyst includes Mn(1,4,7-trimethyl-1,4,7-triazacyclononane)$(OCH_3)_3$—$(PF_6)$, $Mn(IV)_2(u\text{-}O)_3$ (1,4,7-trimethyl-1,4,7-triazacyclononane)$_2$-$(PF_6)_2$, $Mn(III)_2(u\text{-}O)_1(u\text{-}OAc)_2$ (1,4,7-trimethyl-1,4,7-triazacyclononane)$_2$-$(ClO_4)_2$, $Mn(IV)_4(u\text{-}O)_6$(1,4,7-triazacyclononane)$_4$-$(ClO_4)_2$, $Mn(III)Mn(IV)_4(u\text{-}O)_1(u\text{-}OAc)_2$-(1,4,7-trimethyl-1,4,7-triazacyclononane)$_2$-$(ClO_4)_3$, and mixtures thereof. Other suitable ligands include 1,5,9-trimethyl-1,5,9-triazacyclododecane, 2-methyl-1,4,7-triazacyclononane, 2-methyl-1,4,7-triazacyclononane, 1,2,4,7-tetramethyl-1,4,7-triazacyclononane, and mixtures thereof. Cobalt-containing catalysts include, for example, cobalt pentaamine chloride salts, such as $[Co(NH_3)_5Cl]Cl_2$.

In some aspects, the detergent composition comprises from about 0.001 wt % to about 5 wt % of a bleach catalyst relative to the total weight of the composition. For example, the bleach catalyst can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises a chelating agent (i.e., a chelant) that serves to improve the cleaning action of the detergent by scavenging metal ions naturally found in water. Suitable examples of a chelating agent includes, e.g., citric acid, nitriloacetic acid, sodium tripolyphosphate, ethylenediaminetetraacetic acid, diethylenetriaminepentaacetic acid, tetrasodium glutamate diacetate, tetrasodium aspartate diacetate, tetrasodium iminodisuccinate, and combinations thereof. In some aspects, the detergent composition comprises tetrasodium iminodisuccinate.

In some aspects, the detergent composition comprises from about 0.001 wt % to about 5 wt % of a chelating agent relative to the total weight of the composition. For example, the chelating agent can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises a chlorine scavenger. The chlorine scavenger is any compound that can react with chlorine or a chlorine-generating compound (e.g., hypochlorite) to eliminate or reduce the bleaching activity. In some aspects, the chlorine scavenger can also act as a corrosion inhibitor. Examples of a chlorine scavenger include, e.g., an amino acid, potassium nitrate, sodium nitrate, tetrasodium iminodisuccinate, tris (hydroxymethyl)aminomethane, 2-amino-2-methyl-1, 3-propanediol, 2-amino-2-ethyl-1, 3-propanediol, 2-amino-1-butanol, 1-amino-2-propanol, 2-amino-1-propanol, 2-amino-2-methyl-1-propanol, monoethanolamine, diethanolamine, tris (hydroxymethyl)aminomethane, hexamethylenetetramine, and any combination thereof. In some aspects, the chlorine scavenger can be monoethanolamine.

In some aspects, the chlorine scavenger comprises at least one amino acid that is a naturally occurring amino acid, including one of the 20 naturally occurring amino acids (e.g., alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, valine, any salt thereof, or any combination thereof). In some aspects, the amino acid has a charged side chain (e.g., arginine, aspartic acid, glutamic acid, histidine, or lysine). In some aspects, the at least one amino acid has a polar uncharged side chain (e.g., serine, threonine, asparagine, or glutamine). In the aspects, the at least one amino acid has a hydrophobic side chain (e.g., alanine, valine, isoleucine, leucine, methionine, phenylalanine, tyrosine, or tryptophan). In some aspects, the at least one amino acid is cysteine, glycine, or proline. In some aspects, the at least one amino acid has a charged side chain or a polar uncharged side chain. In some aspects, the at least one amino acid is in the form of a salt, e.g., lysine hydrochloride.

In other aspects, the detergent composition comprises from about 0.001 wt % to about 5 wt % of a chlorine scavenger relative to the total weight of the composition. For example, the chlorine scavenger can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises an optical brightener (e.g., a fluorescent whitening agent), which is any suitable hydrophilic compound that absorbs ultra violet light and emits visible (e.g., blue-violet) light to make textiles appear brighter. The optical brightener can comprise a triazole, a stilbene, or a biphenyl group. Examples of the optical brightener include, e.g., 2,2'-(2,5-thienediyl)bis[5-(2-methyl-2-propanyl)-1,3-benzoxazole, 5,5'-((perfluorocyclopent-1-ene-1,2-diyl)bis(5-methylthiophene-4,2-diyl))bis(2-(6-methoxybenzo[d]thiazol-2-yl)-1,3,4-oxadiazole), 5,5'-((perfluorocyclopent-1-ene-1,2-diyl)bis(5-methylthiophene-4,2-diyl))bis(2-(6-methoxybenzo[d]thiazol-2-yl)-1,3,4-oxadiazole), 2',7'-bis(5-(4-(tert-butyl)phenyl)-1,3,4-oxadiazol-2-yl)-$N^3$,$N^3$,$N^6$,$N^6$-tetraphenyl-9,9'-spirobi[fluorene]-3,6-diamine, N,N-diphenyl-4-(5-(4-(triphenylsilyl)phenyl)-1,3,4-oxadiazol-2-yl) aniline, ((4-((4-(5-(4-nitrophenyl)-1,3,4-oxadiazol-2-yl)phenyl)diazenyl)phenyl) azanediyl)bis(ethane-2,1-diyl)diacetate, ((4-((4-(5-(4-((E)-4-nitrostyryl)phenyl)-1,3,4-oxadiazol-2-yl)phenyl)diazenyl)phenyl) azanediyl)bis(ethane-2,1-diyl) diacetate, 4,4'-diamino-2,2'-stilbenedisulfonic acid, 4,4'-bis(benzoxazolyl)-cis-stilbene, and 2,5-bis(benzoxazol-2-yl) thiophene, and combinations thereof. In some aspects, the optical brightener can be 2,2'-(2,5-thienediyl)bis[5-(2-methyl-2-propanyl)-1,3-benzoxazole.

In some aspects, the detergent composition can comprise from about 0.001 wt % to about 5 wt % of an optical brightener relative to the total weight of the composition. For example, the optical brightener can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition can comprise a bitterant (e.g., a bittering agent), which is any suitable compound that imparts a bitter taste to the composition. The bitterant can be added to avoid accidental poisoning. Examples of the bitterant include, e.g., denatonium benzoate, sucrose octaacetate, quercetin, brucine, quassin, and combinations thereof. In an aspect, the bitterant can be denatonium benzoate.

In some aspects, the detergent composition can comprise from about 0.001 wt % to about 1 wt % of a bitterant relative to the total weight of the composition. For example, the optical brightener can be present in an amount from about 0.001 wt % to about 0.9 wt %, about 0.001 wt % to about 0.8 wt %, about 0.001 wt % to about 0.7 wt %, about 0.001 wt % to about 0.5 wt %, about 0.005 wt % to about 1 wt %, about 0.005 wt % to about 0.9 wt %, about 0.005 wt % to about 0.8 wt %, about 0.005 wt % to about 0.6 wt %, about 0.005 wt % to about 0.5 wt %, about 0.01 wt % to about 1 wt %, about 0.01 wt % to about 0.9 wt %, about 0.01 wt % to about 0.8 wt %, about 0.01 wt % to about 0.7 wt %, about 0.05 wt % to about 0.6 wt %, about 0.05 wt % to about 0.5 wt %, about 0.05 wt % to about 0.2 wt %, about 0.05 wt % to about 0.1 wt %, about 0.1 wt % to about 1 wt %, about 0.1 wt % to about 0.9 wt %, about 0.1 wt % to about 0.8 wt %, about 0.1 wt % to about 0.5 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, or about 1 wt % of the total weight of the composition.

In some aspects, the detergent composition comprises a corrosion inhibitor (e.g., an oxygen scavenger), which is any suitable compound that lowers the dissolved oxygen content in the washing medium by reacting with oxygen. The corrosion inhibitor can, for example, protect the inside of a washing machine from rusting. Examples of the corrosion inhibitor include, e.g., an inorganic corrosion inhibitor (e.g., a sulfite, a silicate, a polyphosphate, calcium hydroxide), an organic corrosion inhibitor (e.g., calcium hydrogen carbonate, a sulfonate, a phosphonate, a $C_{12}$-$C_{15}$ alcohol ether phosphate), or a combination thereof. In an aspect, the corrosion inhibitor can be sodium sulfite.

In some aspects, the detergent composition comprises from about 0.001 wt % to about 5 wt % of a corrosion inhibitor (e.g., an oxygen scavenger) relative to the total weight of the composition. For example, the corrosion inhibitor can be present in an amount from about 0.001 wt % to about 4 wt %, about 0.001 wt % to about 3 wt %, about 0.001 wt % to about 2 wt %, about 0.001 wt % to about 1 wt %, about 0.005 wt % to about 5 wt %, about 0.005 wt % to about 4 wt %, about 0.005 wt % to about 3 wt %, about 0.005 wt % to about 2 wt %, about 0.005 wt % to about 1 wt %, about 0.01 wt % to about 5 wt %, about 0.01 wt % to about 3 wt %, about 0.01 wt % to about 2 wt %, about 0.01 wt % to about 1 wt %, about 0.05 wt % to about 5 wt %, about 0.05 wt % to about 3 wt %, about 0.05 wt % to about 2 wt %, about 0.05 wt % to about 1 wt %, about 0.1 wt % to about 5 wt %, about 0.1 wt % to about 3 wt %, about 0.1 wt % to about 2 wt %, about 0.1 wt % to about 1 wt %, about 0.001 wt %, about 0.002 wt %, about 0.003 wt %, about 0.004 wt %, about 0.005 wt %, about 0.006 wt %, about 0.007 wt %, about 0.008 wt %, about 0.009 wt %, about 0.01 wt %, about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 2 wt %, about 2.5 wt %, about 3 wt %, about 3.5 wt %, about 4 wt %, about 4.5 wt %, or about 5 wt % of the total weight of the composition.

In some aspects, the detergent composition comprises a base, a defoamer, an optical brightener, a chelating agent, a corrosion inhibitor, a bitterant, or any combination thereof as additives. In some aspects, the detergent composition comprises a combination of a base (e.g., monoethanolamine), a defoamer (e.g., coconut fatty acid), an optical brightener, a chelating agent (e.g., tetrasodium iminodisuccinate), a corrosion inhibitor (e.g., sodium sulfite), and a bitterant (e.g., denatonium benzoate) as additives.

In an aspect, the unit dose product comprises a pouch formed from a water-soluble film material and a detergent composition disposed within the pouch. The detergent composition comprises about 5 to about 20 weight percent (wt %) water, about 20 to about 65 combined wt % of at least two surfactants comprising a methyl ester sulfonate (MES) and an alcohol ethoxylate (AE), and a non-aqueous solvent. The amounts of each component will be selected to provide a detergent composition comprising 100 wt % of the total composition.

In an aspect, the detergent composition consists essentially of about 5 to about 20 weight percent (wt %) water, about 20 to about 65 combined wt % of at least two surfactants comprising a methyl ester sulfonate (MES) and an alcohol ethoxylate (AE), and a non-aqueous solvent. The amounts of each component will be selected to provide a detergent composition comprising 100 wt % of the total composition.

In an aspect, the detergent composition consists of about 5 to about 20 weight percent (wt %) water, about 20 to about 65 combined wt % of at least two surfactants comprising a methyl ester sulfonate (MES) and an alcohol ethoxylate (AE), and a non-aqueous solvent. The amounts of each component will be selected to provide a detergent composition comprising 100 wt % of the total composition.

In an example, the detergent composition comprises:

about 5 to about 20 wt % water;

about 20 to about 65 wt % of surfactants comprising MES (e.g., sodium methyl 2-sulfolaurate and/or disodium 2-sulfolaurate), AE (e.g., a $C_{12}$-$C_{15}$ fatty alcohol ethoxylate with 7 moles of ethoxylate), and at least one surfactant selected from a methyl ester ethoxylate, an alkyl ether sulfate, coco fatty acid, a linear alkylbenzene sulfonate, and a combination thereof;

at least one additive selected from a base, a performance polymer, an enzyme, a defoamer, a chelating agent, an optical brightener, an anti-redeposition agent, a bitterant, a corrosion inhibitor, and a combination thereof; and a non-aqueous solvent comprising glycerin, propylene glycol, polyethylene glycol, and ethanol.

The amounts of each component will be selected to provide a detergent composition comprising 100 wt % of the total composition. In some aspects of this detergent composition, the detergent composition can include a base, an optical brightener, a chelant, a corrosion inhibitor, and a bitterant as additives.

In an example, the detergent composition consists essentially of:

about 5 to about 20 wt % water;

about 20 to about 65 wt % of surfactants comprising MES (e.g., sodium methyl 2-sulfolaurate and/or disodium 2-sulfolaurate), AE (e.g., a $C_{12}$-$C_{15}$ fatty alcohol ethoxylate with 7 moles of ethoxylate), and at least one surfactant selected from a methyl ester ethoxylate, an alkyl ether sulfate, coco fatty acid, a linear alkylbenzene sulfonate, and a combination thereof;

at least one additive selected from a base, a performance polymer, an enzyme, a defoamer, a chelating agent, an optical brightener, an anti-redeposition agent, a bitterant, a corrosion inhibitor, and a combination thereof; and a non-aqueous solvent comprising glycerin, propylene glycol, polyethylene glycol, and ethanol.

The amounts of each component will be selected to provide a detergent composition comprising 100 wt % of the total composition. In some aspects of this detergent composition, the detergent composition can include a base, an optical brightener, a chelant, a corrosion inhibitor, and a bitterant as additives.

In an example, the detergent composition consists of:

about 5 to about 20 wt % water;

about 20 to about 65 wt % of surfactants comprising MES (e.g., sodium methyl 2-sulfolaurate and/or disodium 2-sulfolaurate), AE (e.g., a $C_{12}$-$C_{15}$ fatty alcohol ethoxylate with 7 moles of ethoxylate), and at least one surfactant selected from a methyl ester ethoxylate, an alkyl ether sulfate, coco fatty acid, a linear alkylbenzene sulfonate, and a combination thereof;

at least one additive selected from a base, a performance polymer, an enzyme, a defoamer, a chelating agent, an optical brightener, an anti-redeposition agent, a bitterant, a corrosion inhibitor, and a combination thereof; and a non-aqueous solvent comprising glycerin, propylene glycol, polyethylene glycol, and ethanol.

The amounts of each component will be selected to provide a detergent composition comprising 100 wt % of the total composition. In some aspects of this detergent composition, the detergent composition can include a base, an optical brightener, a chelant, a corrosion inhibitor, and a bitterant as additives.

The detergent composition is enclosed (e.g., entrapped) within a water-soluble film pouch to form of a unit dose product (e.g., a detergent pack). As used herein, the term "water-soluble" means that least 2 grams of the solute (e.g., the film) dissolves in 5 liters of solvent (e.g., water) for a solubility of at least 0.4 grams per liter (g/1) at a temperature of 25° C. unless otherwise specified. Upon contact with water (e.g., water in the wash cycle in a method of washing), the water-soluble film will release the detergent composition.

The pouch can be a single compartment, and the detergent composition is releasably disposed within the single compartment. Alternatively, the pouch can have two or more (e.g., 2, 3, or 4) compartments that are sealed off from one another, and the detergent composition is releasably disposed within at least one of the two or more compartments. In some aspects, the same detergent composition is present in each compartment of the pouch. In some aspects, the other compartment(s) can include colorants or other components, such as an alternative composition in the form of solid or liquid. In some aspects, the solid composition is a powder, granule, tablet, or combinations thereof. In some aspects, the alternative composition comprises a rinse aid or a fabric softener. In some aspects, different film compositions can be used to form different sections or compartments of the pouch. For example, different films can dissolve at different rates to provide timed release of the compartments' contents.

The sealing of a water-soluble film material (e.g., in the form of one or two sheets) to form a compartment can be performed using methods known to those of skill in the art. In some aspects, the water-soluble film material is sealed using heat-sealing, solvent sealing, or ultraviolet (UV) sealing. In some aspects, the water-soluble film material sealed using water sealing.

The unit dose product (e.g., pouch or detergent pack) can be in any suitable shape and size, e.g., square, rectangular, oval, ellipsoid, superelliptical, or circular shape. In general, the size and shape of the pouch is large enough to enclose (e.g., entrap) about 15 g to about 30 g total weight of the detergent composition.

The water-soluble film is desirably strong, flexible, shock resistant, and non-tacky during storage at both high and low temperatures and high and low humidities. Non-limiting examples of suitable materials for the water-soluble film include, e.g., polyvinyl alcohol (PVOH), polyvinyl acetate (PVA), film-forming cellulosic polymers, polyacrylic acid, polyacrylamide, polyanhydride, a polysaccharide, and combinations thereof. Examples of film-forming cellulosic polymer include, e.g., cellulose, cellulose ether, cellulose ester, cellulose amide, methylcellulose, carboxymethylcellulose sodium, ethylcellulose, hydroxyethyl cellulose, hydroxypropyl methyl cellulose (HPMC), and combinations thereof. Unit dose detergent packs, including water-soluble films, are described in U.S. Pat. Nos. 8,551,929, 10,774,294, and 11,492,574, the disclosures of which are incorporated herein by reference in their entirety. In some aspects, the water-soluble film material comprises polyvinyl alcohol (PVOH) or polyvinyl acetate (PVA).

In an aspect, the water-soluble film material is polyvinyl alcohol (PVOH). In some aspects, the PVOH can have a number average molecular weight range of about 10,000 to about 100,000 g/mol (e.g., about 10,000 to about 80,000 g/mol, about 15,000 to about 60,000 g/mol, about 20,000 to about 50,000 g/mol, about 25,000 to about 40,000 g/mol, or about 27,000 to about 33,000).

In some aspects, the film material comprises a bitterant (e.g., denatonium benzoate) as described herein, to impart a bitter taste to help avoid accidental poisoning.

In some aspects, the film material can have a thickness of about 10 to about 100 μm (e.g., about 10 to 90 μm, about 20 to about 80 μm, about 50 to about 100 μm, about 50 to about 80 μm, about 70 to about 80 μm, about 100 μm, about 95 μm, about 90 μm, about 85 μm, about 80 μm, about 75 μm, about 70 μm, about 65 μm, about 60 μm, about 55 μm, about 50 μm, about 45 μm, about 40 μm, about 35 μm, about 30 μm, about 25 μm, about 20 μm, about 15 μm, or about 10 μm). In some aspects, the film material will have a thickness of about 75 μm.

In some aspects, the present disclosure is directed to a method of using the unit dose product of any of the foregoing aspects. For example, the unit dose product can be used in a method of removing soil from a textile (e.g., cleaning a textile, such as a fabric). In particular, the present disclosure is directed to a method of removing soil from a textile comprising contacting the textile with a composition comprising the unit dose product described herein and water to form a washing load. Optional steps include mixing (agitating) the washing load and composition, removing the composition to provide a clean textile, rinsing the clean textile with additional water, and isolating the clean textile. In some aspects, soils that are suitably removed using the unit dose product include, but are not limited to, oil-containing soils, carbohydrate-containing soils, protein-containing soils, tannin-containing soils, particulate soils, and combinations thereof.

In some aspects of these methods, the method can be performed using a washing machine, a tergotometer, or an equivalent device. In some aspects of these methods, the water is hot or warm water. In some aspects of these methods, the water is cold water.

In an aspect, the method is directed to providing a mild detergent composition.

In an aspect, the method is directed to providing an allergen-free detergent composition.

In an aspect, the method is directed to providing detergent compositions comprising Safer Choice ingredients.

EXAMPLES

These examples are provided for the purpose of illustration only and the embodiments described herein should in no way be construed as being limited to these examples. Rather, the embodiments should be construed to encompass any and all variations which become evident as a result of the teaching provided herein.

Example 1

Detergent formulations for unit dose packages were prepared with target pH of 7.7 in standard overhead mixers with the components listed in Table 1.

TABLE 1

| COMPONENT | Activity % | Formula 1 (wt %) | Formula 2 (wt %) |
|---|---|---|---|
| Non-Aqueous Solvent Glycerin | 99+ | 14.73 | 14.73 |
| Non-Aqueous Solvent Propylene Glycol (PG) | 99+ | 8.21 | 8.21 |
| Non-Aqueous Solvent Polyethylene Glycol (PEG 400) | 99+ | 5.8 | 9.2 |
| Non-Aqueous Solvent SDA-3C Ethanol (200 Proof) | 100 | 3 | 3 |
| Non-ionic surfactant Fatty alcohol ethoxylate (25-7) | 99+ | 23.07 | 23.07 |
| Monoethanolamine | 99+ | 4.80 | 1.4 |
| Water | 100 | 10.5 | 10.5 |
| Anionic surfactant Linear Alkylbenzene Sulfonate | 96 | 17 | 0 |
| Anionic Surfactant Sodium Methyl 2-Sulfolaurate and Disodium 2-Sulfolaurate | 38 | 0 | 44.16 |

TABLE 1-continued

| COMPONENT | Activity % | Formula 1 (wt %) | Formula 2 (wt %) |
|---|---|---|---|
| Anionic surfactant Alkyl ether sulfate, 3EO, 70% paste | 70 | 4.8 | 4.8 |
| Coconut Fatty Acid, optical brightener, iminodisuccinic acid, sodium sulfite (15% solution), bittering agent | 100 | 8.08 | 8.08 |
| Total | | 100.0 | 119.88 |

Due to the higher water content in the MES surfactant, the MES level was matched to the LAS (approx. 17 wt % in the formula). The higher amount of water in the formula was ignored since Zein testing dilutes the samples with water for testing. The additional water in Formula 2 compared to Formula 1 was accounted for during the Zein dilution test step, discussed below.

To test for improved mildness, Formulas 1 and 2 as listed in Table 1 above were assessed using the Zein test, as described in Gott, E., Aesthet. Medzin., Tenside 15:313 (1966) and US 2018/0016523 A1, the disclosures of which are incorporated herein by reference in their entirety. In particular, detergent formulas were diluted 3% with filtered water and Zein protein was added to the solution. The Zein-detergent mixture was stirred for one hour at room temperature. Undissolved Zein protein was then removed by filtration. The weight of undissolved solids was measured in a 3 mL aliquot of the filtered solution following drying in an oven at 70° C. The weight of solids in a 3 mL aliquot of the detergent formula was determined after drying at 70° C. The weight of solids in the detergent formula was then subtracted from the weight of solids in the filtered Zein-detergent mixture and to determine the quantity of dissolved Zein protein. This is then reported as grams dissolved Zein per 100 g formulation, also called the % Zein or "Zein score." The greater the dissolved protein, or higher the % Zein, or Zein score, indicates a more irritating detergent formula.

Formula 1 had a Zein score of 2.27%, with 2.27% of the Zein protein being dissolved by the 3% dilution of Formula 1. Formula 2 had a Zein score of 1.24%, with only 1.24% of the Zein protein being dissolved by the 3% dilution of Formula 2. A Tukey Analysis confirmed the scores were significantly different. These results suggest that the use of methyl ester sulfonate (MES) surfactant improved the mildness of the formulation, thereby reducing irritation potential compared to Formula 1 comprising linear alkylbenzene sulfonate (LAS).

The example formulations can further comprise one or more additives, such as performance polymers (e.g., polyethyleneimine ethoxylate, polyethyleneimine a ethoxylate/propoxylate), an anti-redeposition polymer, and/or enzymes (e.g., a protease, a mannanase, an amylase, or a combination therefore) to further improve the performance.

Example 2

Detergent compositions with reduced LAS and varying concentrations of MES are set forth in Table 2. Compositions can be tested for mildness, swelling ratios, and/or pack height effects.

TABLE 2

| COMPONENT | Activity % | Formula 3 (wt %) | Formula 4 (wt %) | Formula 5 (wt %) |
|---|---|---|---|---|
| Non-Aqueous Solvent Glycerin | 99+ | 14.96 | 14.73 | 14.96 |
| Non-Aqueous Solvent Propylene Glycol (PG) | 99+ | 8.21 | 8.21 | 8.21 |
| Non-Aqueous Solvent Polyethylene Glycol (PEG 400) | 99+ | 21.04 | 9.2 | 9.2 |
| Non-Aqueous Solvent SDA-3C Ethanol (200 Proof) | 100 | 3 | 3 | 3 |
| Anionic surfactant Linear Alkylbenzene Sulfonate | 96 | 0 | 10 | 5 |
| Anionic surfactant Alkyl ether sulfate, 3EO, 70% paste | 70 | 4.8 | 4.8 | 4.8 |
| Anionic Surfactant Sodium Methyl 2-Sulfolaurate and Disodium 2-Sulfolaurate (MES) | 38 | 15.44 | 0 | 0 |
| Anionic Surfactant Sodium Methyl 2-Sulfolaurate and Disodium 2-Sulfolaurate | 100 | 0 | 5.4 | 12 |
| Non-ionic surfactant Fatty alcohol ethoxylate ($C_{12-15}$ fatty acid, 7 mol EO (25-7)) | 99+ | 23.07 | 23.07 | 23.07 |
| Monoethanolamine | 99+ | 1.4 | 3 | 1.4 |
| Water | 100 | 0 | 10.5 | 10.5 |
| Coconut Fatty Acid, optical brightener, iminodisuccinic acid, sodium sulfite (15% solution), bittering agent | 100 | 8.08 | 8.08 | 8.08 |
| Total | | 100 | 100 | 100 |

Example 3

Detergent formulations for unit dose products with varying non-aqueous solvent ratios were prepared using Formula 6 as a base formula (Table 3). Varying concentrations of non-aqueous solvents with ratios (Table 4) were used to prepare Formulas 7-16.

TABLE 3

| COMPONENT | Activity % | Formula 6 (wt %) |
|---|---|---|
| Glycerin | 99+ | 0 |
| Propylene Glycol | 99+ | 0 |
| PEG400 | 99+ | 0 |
| SDA-3C Ethanol (200 Proof) | 100 | 3 |
| Non-ionic Surfactant Alcohol Ethoxylate (25-7) | 99+ | 23.07* |
| Anionic surfactant Linear Alkylbenzene Sulfonate | 96 | 0 |
| Anionic surfactant Alkyl ether sulfate, 3EO, 70% paste | 70 | 4.8* |
| Monoethanolamine | 99+ | 1.4 |
| Water | 100 | 10.5 |
| Coconut Fatty Acid, optical brightener, iminodisuccinic acid, sodium sulfite (15% solution), bittering agent | 100 | 8.08 |
| % Reserved for experimental formulation | | 49.14 |
| Total | | 100 |

*Varying concentrations of surfactants including MES, AE, LAS, AES, MEE, or other surfactants can be utilized in these formulations.

TABLE 4

| Formula | Ratio PEG 400 | PG | Glycerin |
|---|---|---|---|
| 7 | 1 | 0 | 0 |
| 8 | 0 | 1 | 0 |
| 9 | 0 | 0 | 1 |
| 10 | 0.5 | 0.5 | 0 |
| 11 | 0 | 0.5 | 0.5 |
| 12 | 0.5 | 0 | 0.5 |
| 13 | 0.33 | 0.33 | 0.33 |
| 14 | 0.17 | 0.17 | 0.67 |
| 15 | 0.17 | 0.67 | 0.17 |
| 16 | 0.67 | 0.17 | 0.17 |

To measure the percent (%) swelling, a fresh sheet of film was traced and cut into three identical film strips (3 cm wide by 8.5 cm long) for each formula being tested. Strips were labeled #1, #2, and #3 and placed into a tared petri dish one by one, recording the weights of each piece of film individually. Strips #1 and #2 were placed parallel to one another on the bottom of the petri dish and strip #3 was laid perpendicularly over strips #1 and #2. The petri dish was then filled half way, ensuring all film strips were submerged in the formula being tested. The petri dish was wrapped with parafilm, sealing around the edge of the petri dish. The petri dish was placed in a chamber calibrated at 21.1° C. (70° F.) over night. The petri dish was then removed from the chamber, and the parafilm seal was removed.

With a pair of tweezers, strip #3 was removed, allowed to drip for a few seconds, and excess liquid was removed using a series of three delicate wipes designed for chemical use. Strip #3 was placed on the center of a first delicate wipe, which was placed in the center of a heavy duty wipe designed for chemical use. The top and bottom of the delicate wipe were folded over the strip, followed by the left and right sides of the delicate wipe. The delicate wipe was then pressed into the heavy duty wipe, as there was a large amount of excess liquid. The second and third delicate wipes were wrapped using the same procedure but were gently "kneaded" between the thumb and index finders of both hands for approximately 5 seconds. The third (outside) delicate wipe was nearly dry. The delicate wipes were unfolded, and the film strip was removed using tweezers. Consistency in this technique is key to obtaining accurate swelling ratio data.

The cleaned film strip #3 was placed into a clean, tared petri dish lid, and the final weight of the film strip was recorded. The cleaning steps were repeated for strips #1 and #2.

Percent (%) swelling ratios were determined for Formulas 7-16 using polyvinyl alcohol (PVA) strips. The tests were run in triplicate, and the results were averaged. The percent swelling values, as shown in Table 5, were calculated by the formula: (post-weight−pre-weight)/pre-weight.

TABLE 5

| Formula | Pre-weight (grams) | | | Pre-Weight Average (grams) | Post-weight (grams) | | | Post-Weight Average (grams) | % Swelling |
|---|---|---|---|---|---|---|---|---|---|
| 7 | 0.23 | 0.24 | 0.23 | 0.23 | 0.25 | 0.25 | 0.24 | 0.25 | 7.28% |
| 8 | 0.22 | 0.23 | 0.23 | 0.23 | 0.32 | 0.32 | 0.33 | 0.32 | 43.18% |
| 9 | 0.23 | 0.23 | 0.22 | 0.23 | 0.42 | 0.42 | 0.40 | 0.41 | 79.38% |
| 10 | 0.23 | 0.24 | 0.24 | 0.23 | 0.28 | 0.28 | 0.27 | 0.27 | 17.38% |
| 11 | 0.23 | 0.22 | 0.22 | 0.23 | 0.37 | 0.38 | 0.37 | 0.37 | 65.26% |
| 12 | 0.24 | 0.23 | 0.22 | 0.23 | 0.28 | 0.28 | 0.30 | 0.29 | 25.72% |
| 13 | 0.23 | 0.22 | 0.25 | 0.23 | 0.33 | 0.31 | 0.31 | 0.32 | 34.68% |
| 14 | 0.23 | 0.23 | 0.24 | 0.23 | 0.39 | 0.35 | 0.37 | 0.37 | 58.53% |
| 15 | 0.24 | 0.23 | 0.23 | 0.23 | 0.31 | 0.31 | 0.33 | 0.32 | 38.11% |
| 16 | 0.24 | 0.23 | 0.23 | 0.24 | 0.26 | 0.27 | 0.26 | 0.26 | 12.58% |

A lower swelling ratio indicates that the solvent system has less negative impact on the film.

Using Minitab data analysis software (Minitab, LLC, State College, PA) analysis of variance for percent swelling based on the component proportions and estimated regression coefficients were produced as presented in Tables 5 and 6, respectively. The model summary for analysis of variance indicated an S value of 0.0490806, R-squared value of 95.97%, R-squared adjusted value of 95.22%, predicted residual error sum of squares (PRESS) value of 0.0893875, and R-squared predicted value of 94.46%. Overall, the model was significant, with a p value of less than 0.05, and a high R-squared prediction value, which indicates the model can explain that percentage of difference from an actual data point versus the data point predicted from the Estimated Regression Coefficient Equation, i.e., difference of actual vs. predicted.

The estimated regression coefficient for % swelling showed that the polyethylene glycol impacts the polyvinyl alcohol pouch film the least, 0.0663 versus 0.4263 for polypropylene glycol (PG), and 0.8037 for glycerine. Polyethylene glycol impact on swelling was about 6.42 times smaller than the propylene glycol, and about 12.12 times smaller than the glycerine, indicating less destabilization of the polyvinyl alcohol film and therefore a detergent composition with less impact on the polyvinyl alcohol film and a more stable unit dose package product.

TABLE 6

| Source | Degrees of Freedom (DF) | Sequential Sum of Squares (SS) | Adjusted SS | Adjusted Mean of Squares (MS) | F-Value | P-Value |
|---|---|---|---|---|---|---|
| Regression | 5 | 1.55 | 1.55 | 0.31 | 128.59 | 0.000 |
| Linear | 2 | 1.46 | 0.90 | 0.45 | 186.87 | 0.00 |
| Quadratic | 3 | 0.09 | 0.09 | 0.03 | 12.72 | 0.00 |
| PEG*PG | 1 | 0.02 | 0.02 | 0.02 | 6.54 | 0.02 |
| PEG*Glycerin | 1 | 0.07 | 0.07 | 0.07 | 29.83 | 0.00 |
| PG*Glycerin | 1 | 0.01 | 0.01 | 0.01 | 2.37 | 0.14 |
| Residual Error | 27 | 0.07 | 0.07 | 0.00 | | |
| Lack-of-Fit | 5 | 0.01 | 0.01 | 0.00 | 0.42 | 0.83 |
| Pure Error | 22 | 0.06 | 0.06 | 0.00 | | |
| Total | 32 | 1.61 | | | | |

TABLE 7

| | Coefficient of variation (CV) | Standard error of the coefficient | T-value | P-value | Variance inflation factor (VIF) |
|---|---|---|---|---|---|
| PEG | 0.07 | 0.03 | — | — | 1.99 |
| PG | 0.43 | 0.03 | — | — | 2.03 |
| Glycerin | 0.08 | 0.03 | — | — | 2.21 |
| PEG*PG | −0.32 | 0.13 | −2.56 | 0.02 | 2.04 |
| PEG*Glycerin | −0.68 | 0.13 | −5.46 | 0.00 | 2.14 |
| PG*Glycerin | 0.19 | 0.12 | 1.54 | 0.14 | 2.22 |

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A unit dose product comprising:

a) a pouch formed from a water-soluble film material; and b) a detergent composition comprising i. about 5 to about 20 weight percent (wt %) water, ii. about 20 to about 65 combined wt % of at least two surfactants comprising a methyl ester sulfonate (MES) and an alcohol ethoxylate (AE), and iii. a non-aqueous solvent system comprising a polyethylene glycol having a molecular weight of about 400 g/mol (PEG 400), and at least two solvents selected from the group consisting of ethanol, propylene glycol, and glycerin, wherein the detergent composition is disposed within the pouch.

2. The unit dose product of claim 1, wherein the MES comprises the formula $R^1CH(C(=O)OR^2)SO_3X$ wherein $R^1$ is a $C_8$-$C_{18}$ alkyl, $R^2$ is $CH_3$ or X, and X is a cation that balances the charge.

3. The unit dose product of claim 2, wherein the MES comprises at least one of sodium methyl 2-sulfolaurate and disodium 2-sulfolaurate.

4. The unit dose product of claim 3, wherein the MES comprises both sodium methyl 2-sulfolaurate and disodium 2-sulfolaurate.

5. The unit dose product of claim 1, wherein an MES to AE weight ratio is at least 0.5:1.

6. The unit dose product of claim 1, wherein an MES to AE weight ratio is between 0.5:1 and 1:2.5.

7. The unit dose product of claim 1, wherein the at least two surfactants further comprise an alkyl ether sulfate (AES).

8. The unit dose product of claim 1, wherein the detergent composition comprises about 5 to about 20 wt % MES.

9. The unit dose product of claim 1, wherein the detergent composition comprises about 15 to about 30 wt % AE.

10. The unit dose product of claim 1, wherein the at least two surfactants further comprise a linear alkylbenzene sulfonate (LAS).

11. The unit dose product of claim 10, wherein a LAS to MES weight ratio is between about 1:0.5 to about 1:3.

12. The unit dose product of claim 1, wherein the detergent composition does not comprise a linear alkylbenzene sulfonate.

13. The unit dose product of claim 1, wherein the detergent composition comprises not more than 2 wt % monoethanolamine.

14. The unit dose product of claim 1, wherein the detergent composition has a pH of about 6.5 to about 12.

15. The unit dose product of claim 1, wherein the detergent composition has a pH of about 7 to about 8.

16. The unit dose product of claim 1, wherein the non-aqueous solvent comprises PEG 400, propylene glycol, and glycerin in a weight ratio of about 3-5:1:1.

17. The unit dose product of claim 1, wherein the detergent composition further comprises at least one additive selected from a base, an anti-redeposition agent, a performance polymer, a defoamer, an enzyme, a bleaching agent, a bleach activator, a chelating agent, a chlorine scavenger, an optical brightener, a bitterant, a corrosion inhibitor, and a combination thereof.

18. The unit dose product of claim 1, wherein the detergent composition further comprises at least one surfactant selected from a methyl ester ethoxylate, an alkyl ether sulfate, coco fatty acid, a linear alkylbenzene sulfonate, and a combination thereof;

at least one additive selected from a base, a performance polymer, an enzyme, a defoamer, a chelating agent, an optical brightener, an anti-redeposition agent, a bitterant, a corrosion inhibitor, and a combination thereof; and wherein the non-aqueous solvent comprises glycerin, propylene glycol, PEG 400, and ethanol.

19. The unit dose product of claim 1, wherein the water-soluble film material comprises polyvinyl alcohol (PVOH) or polyvinyl acetate (PVA).

* * * * *